United States Patent
Kodaypak et al.

(10) Patent No.: US 10,075,834 B1
(45) Date of Patent: Sep. 11, 2018

(54) EMERGENCY SERVICES DELIVERY

(71) Applicant: AT&T Intellectual Property I, L.P., Atlanta, GA (US)

(72) Inventors: Rajendra Prasad Kodaypak, Sammamish, WA (US); Reza Hussaini, Redmond, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/485,826

(22) Filed: Apr. 12, 2017

(51) Int. Cl.
*H04M 11/04* (2006.01)
*H04W 4/90* (2018.01)
*H04W 4/22* (2009.01)
*H04W 4/04* (2009.01)
*H04L 29/08* (2006.01)

(52) U.S. Cl.
CPC ............... *H04W 4/90* (2018.02); *H04W 4/22* (2013.01); *H04L 67/12* (2013.01); *H04W 4/046* (2013.01)

(58) Field of Classification Search
USPC ............... 340/425.5, 989; 701/412, 117, 206
See application file for complete search history.

(56) References Cited

U.S. PATENT DOCUMENTS

| | | | |
|---|---|---|---|
| 5,428,546 A * | 6/1995 | Shah | G08G 1/127 340/990 |
| 7,286,929 B2 * | 10/2007 | Staton | B60R 25/00 701/467 |
| 8,554,169 B2 | 10/2013 | Daly et al. | |
| 8,954,028 B2 | 2/2015 | Titus et al. | |
| 9,173,070 B2 | 10/2015 | Daly et al. | |
| 9,510,173 B2 | 11/2016 | Cai et al. | |
| 2006/0273884 A1 * | 12/2006 | Watkins | G08B 25/007 340/425.5 |
| 2007/0198168 A1 * | 8/2007 | Nathan | G08G 1/096811 701/117 |
| 2008/0059062 A1 * | 3/2008 | Kanamori | G01C 21/30 701/412 |
| 2014/0134970 A1 | 5/2014 | Pazos et al. | |
| 2015/0111522 A1 | 4/2015 | Titus et al. | |
| 2015/0223028 A1 | 8/2015 | Wang et al. | |
| 2016/0050038 A1 | 2/2016 | Daly et al. | |
| 2016/0075296 A1 * | 3/2016 | Alderman | G08G 1/127 340/989 |
| 2016/0127439 A1 | 5/2016 | Ginnela et al. | |
| 2016/0210858 A1 * | 7/2016 | Foster | G08G 1/0965 |

(Continued)

FOREIGN PATENT DOCUMENTS

KR  101304301 B1  9/2013

*Primary Examiner* — David Q Nguyen
(74) *Attorney, Agent, or Firm* — Amin, Turocy & Watson, LLP

(57) ABSTRACT

A cell broadcast emergency services delivery mechanism for vehicular Internet of Things (IoT) communication is provided. A method can comprise receiving, from a federal emergency management agency device, first data representing federal management emergency event data, aggregating second data representing an emergency event associated with a vehicle with the first data to form third data, based on the emergency event data and the third data, determining a commonality between the first data and the second data, in response to determining the commonality between the first data and the second data, generating metadata, and broadcasting the metadata to the vehicle.

20 Claims, 10 Drawing Sheets

(56) References Cited

U.S. PATENT DOCUMENTS

| | | |
|---|---|---|
| 2016/0295389 A1 | 10/2016 | Daly et al. |
| 2016/0337817 A1 | 11/2016 | Malladi et al. |
| 2017/0013433 A1 | 1/2017 | Lee et al. |
| 2017/0015263 A1* | 1/2017 | Makled .................. B60R 21/00 |
| 2017/0026935 A1 | 1/2017 | Zhang et al. |
| 2017/0086045 A1* | 3/2017 | Lucero .................... H04W 4/22 |
| 2017/0101054 A1* | 4/2017 | Dusane .................. G08G 1/127 |
| 2017/0196026 A1* | 7/2017 | Daoud .................. H04L 67/303 |

* cited by examiner

EMERGENCY SERVICES DELIVERY

TECHNICAL FIELD

The disclosed subject matter relates to providing cell broadcast emergency services delivery for vehicular Internet of Things (IoT) communication.

BACKGROUND

The wireless emergency alert (WEA) network architecture is designed and implemented to support emergency messages of limited length (e.g., up to 82 octets (single page)) on 2G GSM, 3G UMTS, and long term evolution (LTE) radio network environments. The current network architecture was designed with a traffic model assumption of four alerts/minute. The current wireless emergency alert network architecture therefore is not capable of handling emergency broadcast messages of larger sizes with content that requires higher throughput rates.

DETAILED DESCRIPTION

Figure 1:
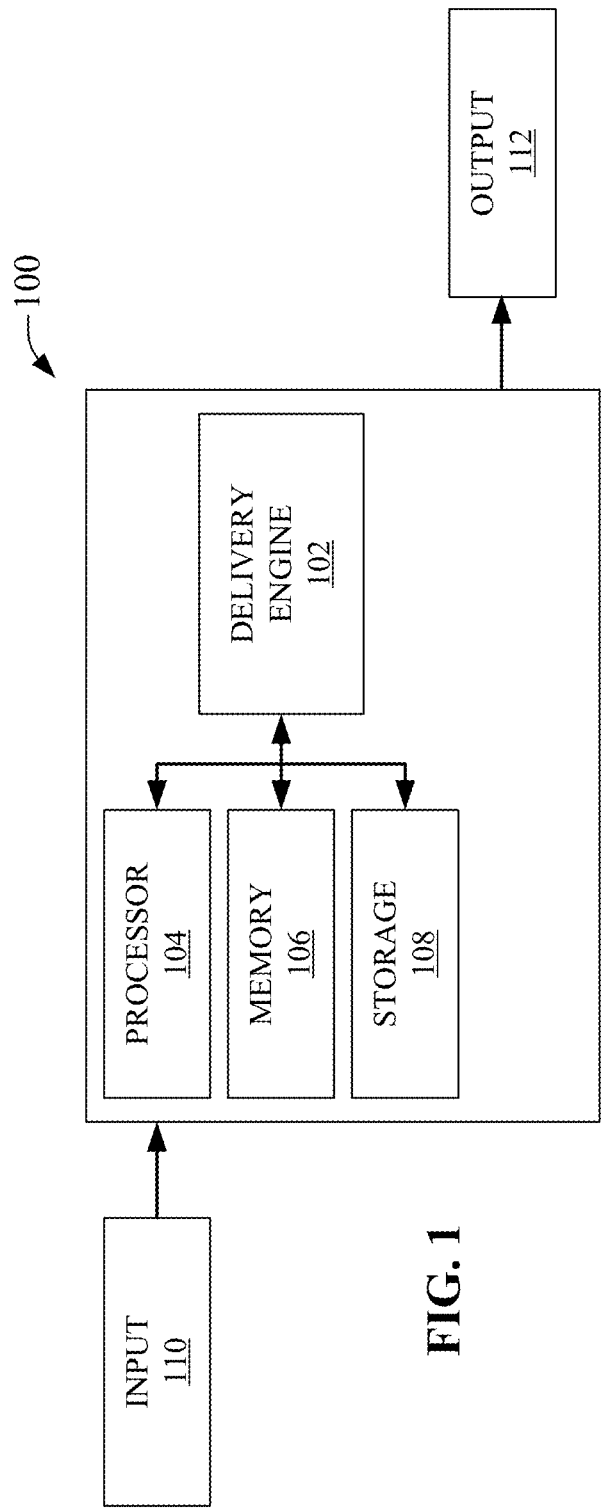
FIG. 1 is an illustration of a system for cell broadcast emergency services delivery for vehicle Internet of Things (IoT) communication, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

It should be realized and appreciated by those of ordinary skill that the foregoing non-limiting example application is merely an illustration of a use of the disclosed and described solution and is provided only for the purposes of exposition. The described and disclosed subject matter is therefore not limited to the foregoing example application, but can find applicability in other more generalized circumstances and use applications.

There are currently discussions in the Federal Communications Commission (FCC) regarding geo targeting granularity, device assisted geo targeting (e.g., user mobile devices determined where it is in relation to defined geographic coordinates and displays a wireless emergency alert when the user mobile device in or proximate to the polygon that circumscribes the defined geographic coordinates), inclusion of Uniform Resource Identifiers (URIs) or Uniform Resource Locators (URLs) in the emergency alert message.

In relation to, and in addition to, the foregoing, there are other potential broadcast services that can be leveraged, such as leveraging existing network infrastructure to support emergency services for next generation of fleet automotive transportation vehicles (including emergency, public safety, schools, and commercial), commercial broadcasts, etc. The wireless emergency alert service (formally known as Commercial Mobile Alert Service (CMAS) network architecture was designed and implemented to support emergency messages with limited lengths of up to 82 octets (single page) on 2G GSM, 3G UMTS and LTE radio. The current wireless emergency alert network architecture does not handle emergency broadcast messages of larger size at higher rates.

The current wireless emergency alert regulatory service was designed with a traffic model assumption of 4 alerts/minute. The wireless emergency alert network infrastructure, in particular radio access network-based delivery has limited capability as the emergency alerts are broadcast over system information block 12 (SIB12) data structures in LTE networks. SIB12 data structures have limitations per standards definition and thus are not suitable for large message delivery.

Alternate mobile core network architecture and design solutions need to be explored to support emergency message delivery with larger size, varying media types (SMS, MMS, images, URLs, file downloads, etc.) and at a higher alerting rate by leveraging existing wireless emergency alert infrastructure and evolved Multimedia Broadcast Multicast Service (eMBMS) solutions, as well as proposing new enhancements into such networks in the way they can be integrated to efficiently interwork with each other to deliver the best service experience to the end-user.

The subject application provides a new signaling interface between the cell broadcast center (CBC) and broadcast multicast service center (BMSC) that can provide a suitable trigger for differentiating emergency and commercial messages broadcast that meets certain pre-defined message characteristics. Such capabilities can be dynamically learned via mapping functions in the CBC and segregating the emergency versus commercial broadcast requests during alert generation. By leveraging a simple control plane engine that performs integrated Mobility Management Entity (MME)/S4-SGSN and Multimedia Broadcast Multicast Service gateway (MBMS-GW) core network functions, the CBC and BMSC can interact efficiently and optimally with the control engine to differentiate and trigger on-demand session establishment for rapid emergency and commercial broadcast message alert delivery.

In traditional cellular mobility network architectures developed for broadcast warning message alert delivery, regulatory and public safety authorities have provides a feed for the alert to be propagated into the mobility network through the CBC. In long term evolution (LTE) networks, the CBC leverages a SBc interface towards the MME to deliver the warning messages. The MME then uses S1AP messaging to complete the emergency broadcasts in the targeted cells.

With the advances in vehicular communications, intelligent networking of automotive/fleet, humans, and internet of things (IoT) device connectivity, there is a need for an enhanced emergency broadcast warning alert delivery network infrastructure. These alerts that can be generated by a variety of transport vehicles in different forms from a given location or across multiple geographic locations can be used in turn by the cell broadcast network intelligently as potential warning indications to incoming vehicles to steer such traffic away, to avoid impending congestion, transport delays, emergency situation handling, efficient human-machine interactions, etc.

The current 3GPP standards based cell broadcast network architecture cannot handle the signaling load generated by massive numbers of devices in a single cell or across multiple cells in a given coverage area. While the SBc interface can help CBC deliver the warning alert messages (with limited characters, 90 bytes) to MME via the control plane, the CBC in its current design is not equipped to handle and deliver alerts with larger message sizes of a few kilobytes (KB) from commercial providers on the SBc interface. For example, if a commercial service provider wants to send emergency broadcast alerts to users within a target geographic area with rich data sets (images, files, coupons, etc.), the control plane delivery method via CBC is not optimal. Such an architecture has fundamental limitations in terms of data handling, capacity, scalability, latency and service reliability as it affects all network elements—CBC, MME, RAN, and the way these interwork at the control plane before the final broadcast delivery happens via SIB12 data structure message over the air. SIB12 data structure based message delivery has pre-defined limits and exceeding these limits can result in data fragmentation which in turn can lead to extended emergency broadcast message delivery times that may not be acceptable. eNodeB (eNB) devices can support limited numbers of simultaneous alert broadcasts, which can possibly result in throttling of any new or additional emergency alert broadcast requests.

To overcome the data fragmentation and extend delivery issues associated with cell broadcast architecture, the subject disclosure provides a direct signaling interface between the CBC and the BMSC that is utilized by the CBC to generate traffic event notifications or certificate management and distribution towards a targeted and defined geo-mapped polygonal area. Such a trigger can be generated by the CBC based on stimulus received from external cell broadcast entities (CBE) that can be fed to a traffic aggregator for commercial requests or direct interface "1" from each CBE to CBC. The direct interface model helps in converging emergency and commercial broadcast network architectures, as well as simplifies the overall broadcast delivery method for any type of message alerts targeted for efficient human, machine interactions.

The disclosed systems and methods, in accordance with an embodiment, provide a machine, system, apparatus, or device comprising: a processor; and a memory that stores executable instructions that, when executed by the processor, facilitate performance of operations. The operations can comprise receiving first data representative of an emergency event associated with a vehicle, aggregating the first data with second data to form third data, determining, as a function of the emergency event and the third data, a commonality between the first data and the second data; based on the commonality identified between the first data and the second data generating metadata; and transmitting the metadata to the vehicle.

Additional operations can include identifying a network device of network devices situated in a defined geographical area represented by a longitude coordinate and a latitude coordinate, determining a defined peripheral boundary that circumscribes the longitude coordinate and the latitude coordinate, and identifying the network device (e.g., eNodeB devices, cell devices, tracking area identifiers (TAIs), etc) within the defined peripheral boundary.

In relation to the foregoing, the second data can have been received from a federal emergency management agency device. The first data can comprise longitude coordinate data associated with a vehicle and latitude coordinate data also associated with the vehicle. The first data can have been received in response to an engine control unit associated with the vehicle having detected a deceleration, or change in velocity, of the vehicle and/or the first data can have been received in response to an engine control unit associated with the vehicle having detected a deployment of an bag safety device of the vehicle.

In accordance with a further embodiment, the subject disclosure describes a method or process, comprising a series of acts that can include: receiving, by a system comprising a processor, first data representative of an emergency event associated with a vehicle, associating, by the system, the first data with second data to form third data, based on the emergency event data and the third data, determining, by the system, an existence of a commonality between the first data and the second data, generating metadata, by the system, as a function of the existence of the commonality; and sending the metadata to the vehicles in the area of relevance.

Further acts can comprise receiving the second data from federal emergency management agency devices, identifying network devices located in defined geographical areas as a function of longitude coordinates and latitude coordinates, and determining defined peripheral boundaries that polygonally surround the longitude coordinates and the latitude coordinates, wherein the longitude coordinates and the latitude coordinates are associated with the vehicle and wherein the longitude coordinates and the latitude coordinates are obtained from global positioning satellite system devices.

In accordance with a still further embodiment, the subject disclosure describes a machine readable storage medium, a computer readable storage device, or non-transitory machine readable media comprising instructions that, in response to execution, cause a computing system comprising at least one processor to perform operations. The operations can include: receiving, from a federal emergency management agency device, first data representing federal management emergency event data, aggregating second data representing an emergency event associated with a vehicle with the first data to form third data, based on the emergency event data and the third data, determining a common cross-section between the first data and the second data, in response to determining the common cross-section between the first data and the second data, generating metadata, and broadcasting the metadata to the vehicle.

Further operations can comprise initiating a session establishment protocol to establish a session with a network device of network devices associated with a radio access network, and as a function of a longitude coordinate associated with the network device and a latitude coordinate associated with the network device, determining a defined peripheral boundary that encloses the network device.

Now with reference to the Figures, FIG. 1 illustrates a system 100 that in accordance with various embodiments provides a system, machine, apparatus, or device for cell broadcast emergency services delivery for vehicular Internet of Things (IoT) communication. System 100, for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 100 can include tablet computing devices, handheld devices, server class computing devices, machines, and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, consumer and/or industrial appliances and/or instrumentation associated with automotive vehicles, industrial and/or consumer appliances and/or instrumentation associated with aerospace vehicles and/or satellites orbiting in low earth orbit, geosynchronous orbit, and the like.

As illustrated, system 100 can comprise delivery engine 102 that can be in operative communication with processor 104, memory 106, and storage 108. Delivery engine 102 can be in communication with processor 104 for facilitating operation of computer-executable instructions or machine-executable instructions and/or components by delivery engine 102, memory 106, for storing data and/or computer-executable instructions or machine-executable instructions and/or components, and storage 108 for providing longer term storage of data and/or machine-readable instructions and/or computer-readable instructions. Additionally, system 100 can also receive input 110 for use, manipulation, and/or transformation by delivery engine 102 to produce one or more useful, concrete, and tangible results, and/or transform one or more articles to different states or things. Further, system 100 can also generate and output the useful, concrete, and tangible results and/or the transformed one or more articles as output 112.

In accordance with an embodiment delivery engine 102 can receive, as input 110, event data from devices that can be associated with vehicles, such as wagons, bicycles, motor vehicles (e.g., motorcycles, cars, trucks, buses, . . . ), railed vehicles (e.g., trains, trams, rolling stock, etc.), watercraft (e.g., ships, boats), aircraft, and/or spacecraft. Typically, the devices associated with vehicles can be in communication with, for instance, engine control unit (ECU) devices that typically control engines (e.g., internal combustion engines, aviation/aircraft engines, diesel electric engines, and the like) to ensure optimal engine performance. ECU devices typically control engine functionality by reading data values from a plurality of sensors, and interpreting the data values using, for instance, multidimensional performance maps (e.g., lookup tables, or other data structures), and adjusting (e.g., through actuators associated with the engine) engine parameters, such as air fuel mixture, ignition timing, idle speed, etc. Other devices that can also be associated with vehicles can include sensors/devices that indicate whether collision avoidance devices affiliated, externally and/or internally, with the vehicle have been deployed. For instance, application of emergency braking; deployment of bag devices; monitoring of wheel speed indicators (e.g., used to provide indication of icy or rain slicked road conditions, etc.); sensors that indicate ambient air temperatures and humidity (e.g., inside and outside the vehicle); . . . .

In the context of the other devices that can be associated with, or communicatively coupled to, vehicles and/or affiliated ECU devices, these devices, like system 100, can be any type of mechanism, machine, device, facility, apparatus, and/or instrument that includes a processor and/or is capable of effective and/or operative communication with a wired and/or wireless network topology. Machines, mechanisms, apparatuses, devices, facilities, and/or instruments that can comprise these other devices that can be associated with, or communicatively coupled to, vehicles and/or affiliated ECU devices can include tablet computing devices, handheld devices, server class computing devices and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, consumer and/or industrial appliances and/or instrumentation associated with automotive vehicles, industrial and/or consumer appliances and/or instrumentation associated with aerospace vehicles and/or satellites orbiting in low earth orbit, geosynchronous orbit, and the like.

Delivery engine 102, based on, as a function of, or in response to receiving event data from devices associated with, or coupled to, vehicles, analyzes the event data based on criteria, such as geographical location information regarding the geographical location (e.g., latitude and longitude data/coordinates, geo-location codes, GPS coordinates) of the vehicle, type of conditions being experienced by the vehicle as indicated by multiple sensors associated with the vehicle.

In accordance with an embodiment, the geographical location information can be obtained from a network device (e.g. eNodeB device, access point device, serving cell device, cell broadcast center device, . . . ) with which the respective devices associated with, or coupled to, the vehicles are in communication. For example, devices associated with a vehicle can be in communication with, and located in the proximity of, a network device that is situated at the geographic coordinate: 22° 17' 07" North, 114° 09' 27" East (e.g., latitude: 22° 17' 07" N, longitude: 114° 09' 27" E). Accordingly, based on the geographic coordinate data attributed to the network device, it can be determined that the vehicle is in the vicinity of the geographic coordinate: 22° 17' 07" North, 114° 09' 27" East.

In accordance with an additional embodiment, the geographical location information of the vehicle can be obtained from a space-based radio navigation system, such as the global positioning system (GPS). The geographical location information can have been included in the event data transmitted and/or communicated by the devices that are in data interchange with the network device and that are associated with, or coupled to, the vehicles.

Other information that can comprise event data can include information such as whether emergency breaking has been initiated; whether collision avoidance measures have been undertaken (e.g., by the driver, or automatically, in the case of a vehicle capable of sensing its environment and navigating without human input); whether vehicle safety devices and/or occupant restraint systems have been activated; whether engine speeds have been gradually reduced from a first non-idle speed to an idle speed, or rapidly reduced from a first non-idle speed to engine shut off within a curtailed definable period of time; whether the vehicle came to a gradual stop/halt or an abrupt stop/halt; and/or weather conditions that the vehicle can currently be experiencing (e.g., blizzard conditions, freezing rain, torrential rain, hail, sleet, high wind speeds, sun glare, . . . ). Further information that can also comprise event data can be information associated with road impediments/hazards, such as whether there have been landslides, rock falls, fallen trees/tree limbs, fallen telephone poles due to high winds or ice events (e.g., freezing rain), downed power lines (transmission lines), and other impediments/hazards on the road. Additional information that can also comprise event data can include information associated with traffic conditions (e.g., traffic accidents, traffic congestion, traffic slow downs, presence of emergency vehicles), accident events, and other emergency events occurring in the vicinity of the geographic coordinate data/geographical location information, etc.

Subsequent to analyzing the event data, delivery engine 102 can aggregate the data based on the analysis and/or one or more characteristic associated with the event to form metadata. For instance, delivery engine 102 can aggregate the received events to form metadata based on at least one of geographical location, time, type of incident that has occurred, weather conditions currently being encountered by the vehicle, road impediment/hazards experienced by the vehicle, etc. For example, in an embodiment, delivery engine 102 can aggregate the received data to form metadata based on a commonality of geographical location, time, and/or weather condition experienced by a first vehicle and a plurality of second vehicles that can share the commonality of geographical location, time, and/or weather condition experienced. In an alternative and/or additional embodiment, delivery engine 102 can aggregate the received event data to form metadata as a function of a commonality of geographical location and/or road impediment/hazard experienced by first and second vehicles. In an additional and/or alternative embodiment, delivery engine 102 can aggregate the received event data to form metadata based on time and/or type of incident that has occurred. Additionally, and/or alternatively, delivery engine 102 can aggregate the received event data with federal emergency management agency data that can have been received from a federal emergency management agency device, wherein the federal emergency management agency device supplies, based on geographical location, federal emergency management agency data representing data such as Amber alert data, evacuation data (e.g., data associated with the fact that certain areas/zones have been declared evacuation zones due to natural disasters, or impending natural disasters, such blizzards, hurricanes, tornadoes, landslides, earthquakes, and the like), road closures (e.g., due to hazardous material spills, slick road surfaces, heavy fog, and/or earlier traffic accidents caused by, or as consequence of, hazardous material spills, slick road surfaces, heavy fog, . . . ), imposition of curfews, and the like. For instance, delivery engine 102 can aggregate, correlate, collate, and collect the received event data based on the a commonality of geographical location of vehicles and federal emergency management agency data.

Delivery engine 102 can thereafter analyzes the metadata based on, for example, one or more of geographical location, time, type of incident that has occurred, weather conditions currently being encountered by the vehicle, road impediment/hazards experienced by the vehicle, federal emergency management agency data in the context of Amber alert data, data associated evacuations relating to natural disasters/impending natural disasters, road closures/impending road closures, and the like to generate broadcast data. Broadcast data can, for example, be generated by delivery engine 102 based on time data, geographical location data, and federal emergency management agency data, so that when, for instance, an Amber alert is initiated, an emergency message can be selectively broadcast to all vehicles in a defined or specific geographical area and geographically surrounding areas. In this manner, broadcast data can be directed, by delivery engine 102, to only those defined and/or specified areas within which there is an immediate urgency, or within which the broadcast data will have immediate impact and/or effect.

In regard to the foregoing analysis of metadata based on, for instance, geographical location, time, type of instance, weather conditions road impediment/hazards, delivery engine 102, as a function of geographical coordinate data (e.g., geographical location) can determine a transmission area that can bound the geographical coordinate data. For instance, delivery engine 102 can determine that the transmission area bounding the geographical coordinate area should encompass an area of $\pi r^2$, where r is a radius measured using relevant coordinate data.

Delivery engine 102, in response to having generated broadcast data and using one or more establishment protocols, can initiate and establish communications sessions with a plurality of devices associated with a radio access network (e.g., universal mobile telecommunications system (UTMS) terrestrial radio access network (UTRAN) and/or evolved UTMS terrestrial radio access network (EU-TRAN)). Devices associated with the radio access network with which delivery engine 102 can initiate and establish a session can include eNodeB devices, access point devices, base station devices, home eNodeB devices, femto cell devices, Pico cell devices, and the like. Each of the plurality of devices associated with the radio access network, in response to receiving a request to initiate and establish a communication session with delivery engine 102, can respond with acknowledgment data that notifies that at least one of the plurality of devices is ready to commence data interchange with delivery engine 102 (e.g., acknowledgement that one or more of the plurality of devices is in a state of readiness to communicate with delivery engine 102); and that the a communication session has been established.

Thereafter, delivery engine 102, on receiving an acknowledgment from one or more of the plurality of devices that the one or more of the plurality of devices are in a state of readiness to communicate with delivery engine 102, can send the broadcast message to the one or more of the plurality devices (e.g., eNodeB devices, access point devices, base station devices, home eNodeB devices, femto cell devices, Pico cell devices, and the like). It will be noted at this juncture that the one or more of the plurality of devices will have been typically selected/identified by delivery engine 102 based on, as a function of, or in response to determination of a pertinent transmission area(s). For instance, in accordance with an aspect, the transmission area(s) can be determined by delivery engine 102 based on an area(s) immediately surrounding and/or contiguous to system 100. In accordance with an additional and/or alternative aspect, the transmission area(s) can be determined by delivery engine 102 based on a contiguous area(s) that surround the geographic coordinate data supplied in event data received from devices associated with vehicles. In accordance with yet a further aspect, the transmission area(s) can be determined by delivery engine 102 based on a polygonally adjoining area(s) that bound or surrounds the geographic coordinate data that can have been supplied and included in the event data. The neighboring, contiguous, adjacent, abutting area(s) identified and/or determined by delivery engine 102 can include one or more other systems that can have similar functionalities to those described herein in regard to system 100. As such system 100, and the one or more other systems with facilities and/or functionalities similar to those described from system 100, can collaborate with each other in broadcasting the broadcast message to the plurality of devices associated with a radio access network, such as eNodeB devices, access point devices, base station devices, home eNodeB devices, femto cell devices, Pico cell devices, and the like. The plurality of devices associated with the radio access network can thereafter broadcast the broadcast message to devices that are in communication with the plurality of devices. For example, where delivery engine 102 sends the broadcast message to an eNodeB device of eNodeB devices in a transmission area defined by delivery engine 102, the eNodeB device can forward the broadcast message to a user equipment device associated with a first vehicle situated in the broadcasting area of the eNodeB device and in proximity to the geographic coordinate data that was earlier received by delivery engine 102 as event data, or determined by delivery engine 102 as a function of the geographic coordinate data included in the event data.

Figure 2:
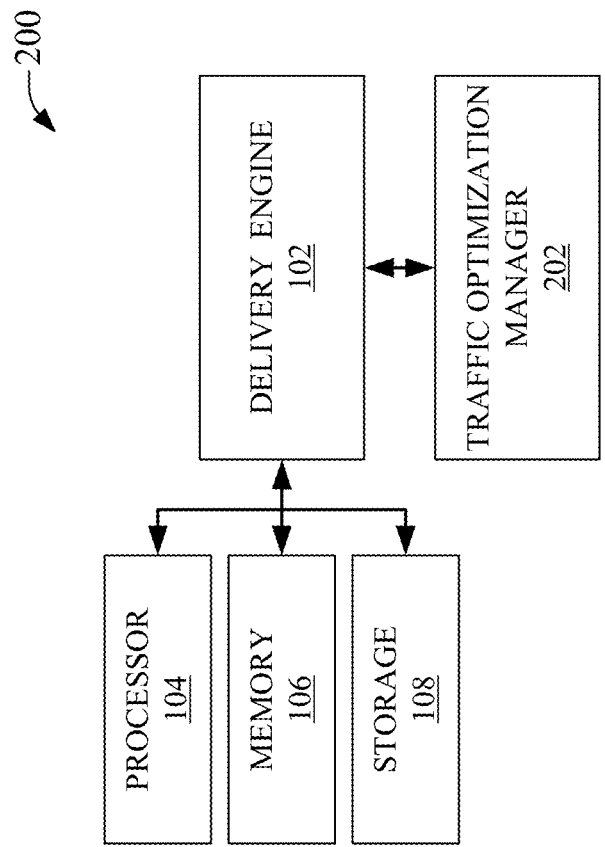
FIG. 2 is a further depiction of a further system for cell broadcast emergency services delivery for vehicle Internet of Things (IoT) communication, in accordance with aspects of the subject disclosure.

FIG. 2 depicts a further illustration of a system 100, now illustrated as system 200, for cell broadcast emergency services delivery for vehicular Internet of Things (IoT) communication. As illustrated, system 200 can include traffic optimization manager 202 that in collaboration with delivery engine 102, processor 104, memory 106, and/or storage 108 can receive event data from devices associated with vehicles. The event data can be received from devices associated with vehicles and can comprise data related to engine functionality, data representing whether or not collision avoidance devices have been deployed, data related to wheel speed indicators, or data indicative of ambient at temperatures and humidity, both inside and outside a vehicle. Additionally, the event data can include geographic coordinate data, geo-location codes, or data obtained from space-based radio navigation systems.

Traffic optimization manager 202 can aggregate the received event data based on commonalities of criteria associated with the received event data. For instance, traffic optimization manager 202 can aggregate, sort, correlate, and/or collate the received event data as a function of geographic coordinate data, geo-location code, and/or data obtained from space-based radio navigation systems. Further, traffic optimization manager 202 can aggregate, sort, correlate, and/or collate the received event data based on the type of data such as data representing engine functionality, data representing whether or not collision avoidance devices have been deployed, data related to wheel speed indicators, and/or data indicative of environmental conditions inside and outside a vehicle. Additionally, traffic optimization manager 202 can aggregate, sort, correlate, and/or collate event data with federal emergency management agency data that can have been received by traffic optimization manager 202 from one or more federal emergency management agency devices. The aggregated, sorted, correlated, and/or collated data can form metadata.

As has been noted earlier, federal emergency management data can include data related to Amber alerts, evacuation data, road closure information, imposition of curfews, and the like. Thus, traffic optimization manager 202, in addition to aggregating the received event data as a function of commonalities associated with geographic coordinate data, geo-location code, and/or data obtained from space-based radio navigation systems, type of data representing one or more of engine functionality, whether or not collision avoidance devices have been deployed, wheel speed indicators information, and/or data indicative and environmental conditions experienced within and outside the vehicle, can also aggregate, correlate, and/or collate the data as a function of commonalities associated with federal emergency management data.

Traffic optimization manager 202 can analyze the metadata as a function of second commonalities of criteria representative, for example, of geographical coordinates associated with the metadata. Traffic optimization manager 102 can perform such analysis using, for example, artificial intelligence functionalities associated with delivery engine 102. Such artificial intelligence functionalities can include using classifiers that map an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to infer an action that can be automatically performed.

A support vector machine is an example of a classifier that can be employed. The support vector machine can operate by finding a hypersurface in the space of possible inputs, which the hypersurface attempts to split triggering criteria from non-triggering events. Intuitively, this makes a classification correct for testing data that is near, but not identical to training data. Other directed and undirected model classification approaches can include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

Additionally, traffic optimization manager 202, as a function of geographic coordinate data included in the metadata can determine pertinent transmission area(s) for broadcast of broadcast data. For instance, in accordance with an aspect, the transmission area(s) can be determined based on an area(s) immediately surrounding and/or contiguous to system 200. In accordance with additional and/or alternative embodiments, the transmission area(s) can be determined as a function of contiguities related to area(s) that can surround the geographic coordinate data included in event data received from devices associated with vehicles. In accordance with yet a further aspect, the transmission area(s) can be determined as functions polygonally adjacent area(s) that bound or surrounds the geographic coordinate data that can have been supplied and included in earlier supplied event data and compiled, by traffic optimization manage 202, as metadata. Neighboring, contiguous, adjacent, abutting area(s) can include one or more other systems that can have similar functionalities to those described herein in regard to system 100. System 100, and the one or more other collaborating systems can transmit broadcast messages to a plurality of devices associated with a radio access network, such as eNodeB devices, access point devices, base station devices, home eNodeB devices, femto cell devices, Pico cell devices, and the like. The plurality of devices associated with the radio access network can thereafter broadcast the broadcast message to devices that are in communication with the plurality of devices.

Figure 3:
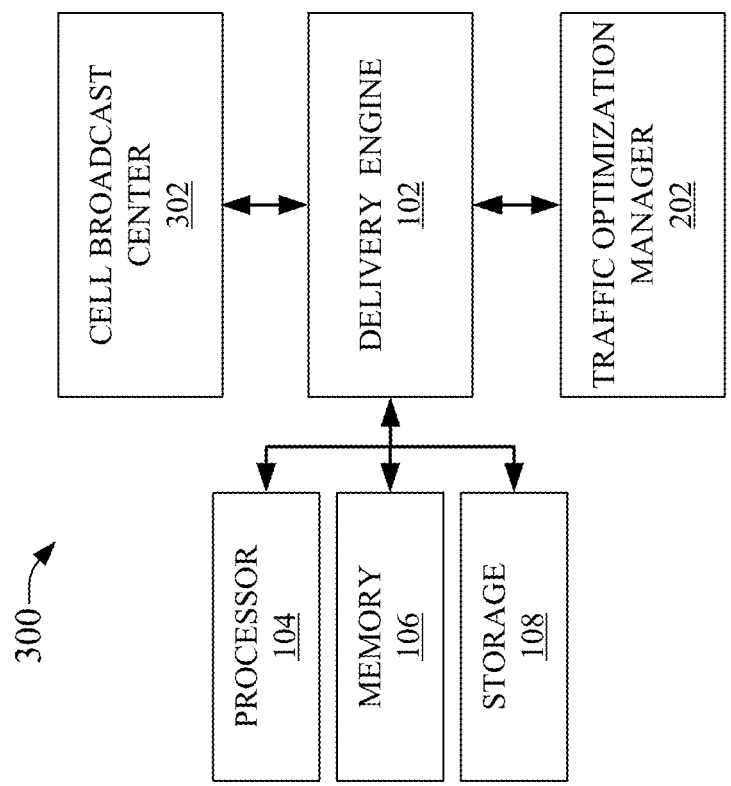
FIG. 3 provides illustration of an additional system for cell broadcast emergency services delivery for vehicle Internet of Things (IoT) communication, in accordance with aspects of the subject disclosure.

FIG. 3 illustrates a further depiction of system 100, now illustrated as system 300, for cell broadcast emergency services delivery for vehicle Internet of Things (IoT) communication. As depicted, system 300 can include cell broadcast center 302, that in collaboration with traffic optimization manager 202, delivery engine 102, processor, 104, memory 106, and/or storage 108 can receive data representing at least geographic coordinate/geolocation code data and/or event metadata from traffic optimization manager 202 and as a function of the geographic coordinate/geolocation code data determines an area in which an event is occurring (or has already occurred) that affects at least one vehicle at the geographic coordinate/geolocation code data point or in the proximity of the geographic coordinate/geolocation code data point.

Cell broadcast center 302 can determine the affected area based on, or as a function of, geographic coordinate/geolocation code data and event metadata. For example, cell broadcast center 302 can identify an affected area as a function of a quantum of events (or an aggregation of events) relating to, for instance, a traffic slowdown (bottleneck). For instance, a traffic bottleneck/slowdown can be indicated by a plethora of vehicle within proximity of geographic coordinate/geolocation code data point(s) reporting application of emergency braking at a near contemporaneity of time).

Additionally, cell broadcast center 302 can determine an affected area as a function of input received from one or more federal emergency management agency devices. For instance, in response to receiving data representing federal emergency management agency data, such as Amber alerts, evacuation directives, hazardous condition events, impeding weather warnings, . . . , cell broadcast center 302 can identify a geographic area to which the federal emergency management agency data pertains and into which the federal emergency management agency data should be broadcast. As will be appreciated, the federal emergency management agency data can include geographical location data that the cell broadcast center 302 can resolve to ascertain the appropriate location into which a broadcast message should be broadcast.

Further, cell broadcast center 302 can also determine whether received data, for instance, federal emergency management agency data is data heavy. Cell broadcast center 302 can determine whether received data is data heavy based at least in part on whether the received data comprises text data and/or uniform resource identifier (URI) data or uniform resource location (URL) data. In instances, where cell broadcast center 302 identifies that receive data comprises text data and/or uniform resource identifier data or uniform resource location data, cell broadcast center 302 can steer such received data to broadcast multicast service center 402. In instances where cell broadcast center 302 identifies the received data as comprising text data, cell broadcast center 302 can direct such received data to multimedia broadcast gateway 602.

Figure 4:
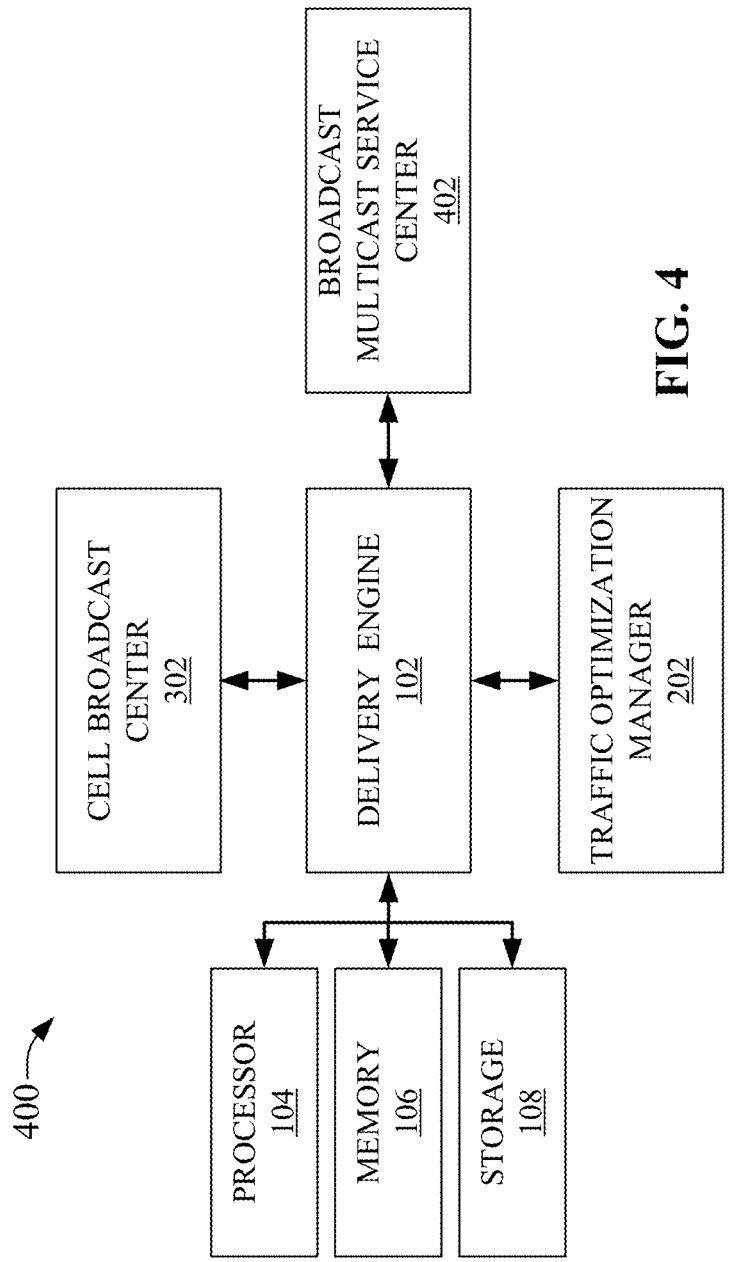
FIG. 4 provides illustration of another system for cell broadcast emergency services delivery for vehicle Internet of Things (IoT) communication, in accordance with aspects of the subject disclosure.

FIG. 4 provides additional depiction of system 100, now illustrated as system 400, for cell broadcast emergency services delivery for vehicle Internet of Things (IoT) communication. System 400 can include broadcast multicast service center 402, that in collaboration with cell broadcast center 302, traffic optimization manager 202, delivery engine 102, processor, 104, memory 106, and/or storage 108, for example, can receive input from cell broadcast center 302 representing affected areas to further identify and determine devices associated with the radio access network (e.g., devices associated with the universal mobile telecommunications system (UTMS) terrestrial radio access network (UTRAN) and/or evolved UTMS terrestrial radio access network (EUTRAN)) that are most proximate to the geographic coordinate/geolocation code data within the broadcast area identified by cell broadcast center 302.

Further, broadcast multicast service center 402 can determine a defined duration that an alert/broadcast message should be broadcast by the devices associated with the radio access network and a number of times within the defined duration that the alert/broadcast message should be repeated. In accordance with an embodiment, the duration and the number of times that an alert/broadcast message can be set so that the alert/broadcast message is broadcast for a duration of two hours and the number of times within the duration the alert/broadcast message repeated can be set for four times in each hour. In accordance with an additional or alternative embodiment, the duration can be set to be one hour and the number of times within the hour that the alert/broadcast message is to be repeated can be set to every five minutes within the duration.

Broadcast multicast service center 402 can also initiate establishment procedures/protocols to establish sessions with devices associated with the radio access network, wherein the devices associated with the radio access network can include eNodeB devices, access point devices, Pico cell devices, femto cell devices, and the like.

Figure 5:
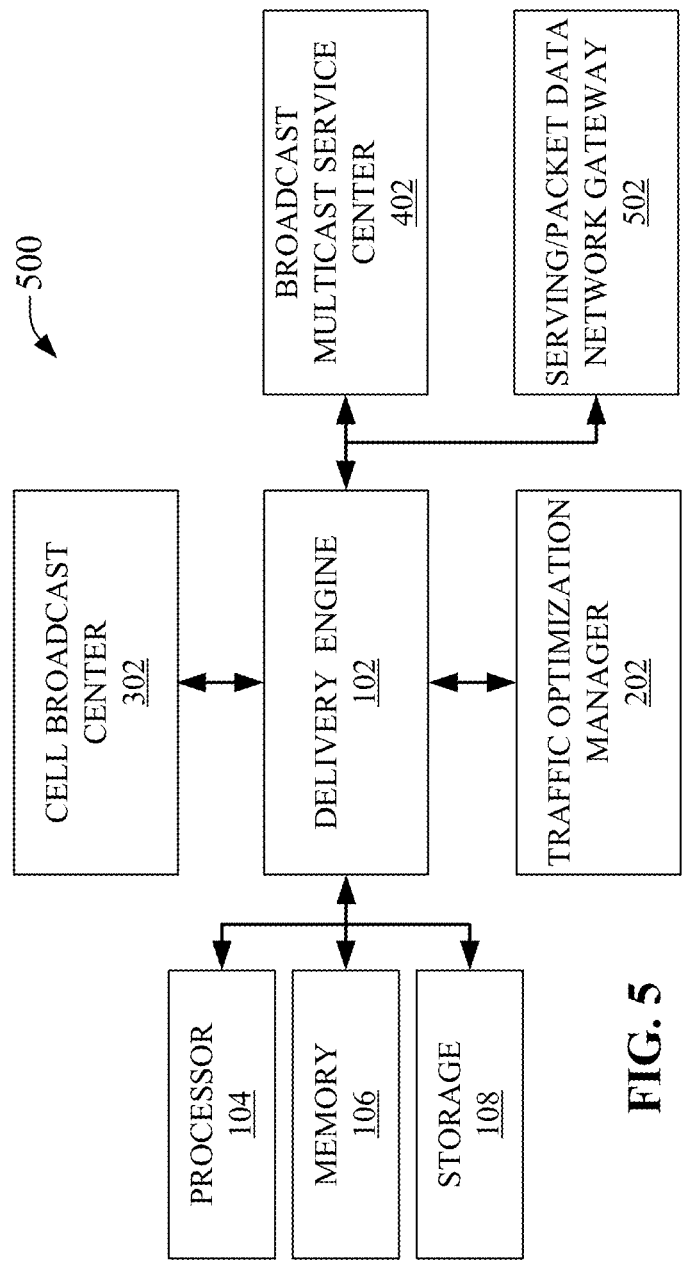
FIG. 5 provides depiction of a further system for cell broadcast emergency services delivery for vehicle Internet of Things (IoT) communication, in accordance with aspects of the subject disclosure.

FIG. 5 provides further illustration of system 100, now depicted as system 500, for cell broadcast emergency services delivery for vehicle Internet of Things (IoT) communication. System 500 includes serving/packet data network gateway 502, in conjunction with broadcast multicast service center 402, cell broadcast center 302, traffic optimization manager 202, delivery engine 102, processor 104, memory 106, and/or storage 108, performs and provides an interconnection between devices associated with the radio access network (e.g., eNodeB devices, access point devices, Home eNodeB devices (e.g., HeNB devices), Pico cell devices, femto cell devices, etc.) and user equipment devices that can be associated with, or affiliated with vehicles. Serving/packet data network gateway 502 routes and forwards data packets between devices associated with the radio access network and user equipment devices affiliated/associated with vehicles over the control plane and/or the user plane.

Figure 6:
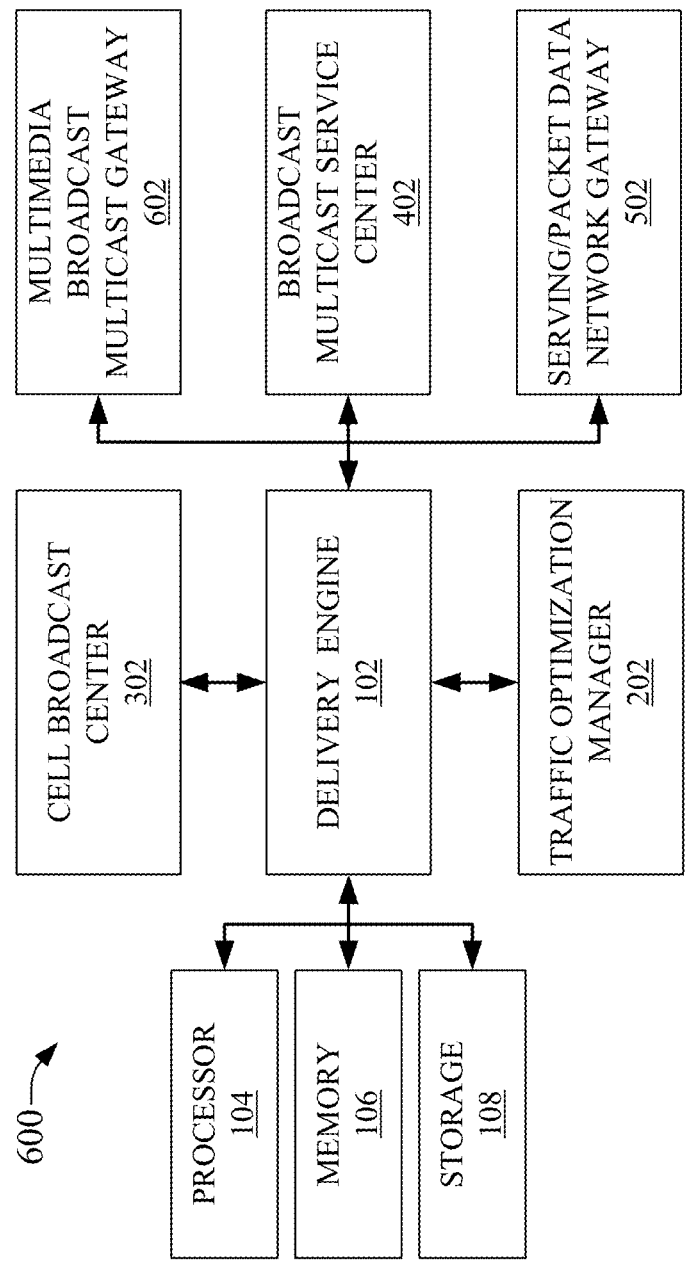
FIG. 6 provides additional illustration of a system for cell broadcast emergency services delivery for vehicle Internet of Things (IoT) communication, in accordance with aspects of the subject disclosure FIG. 7 provides illustration of a flow or method for cell broadcast emergency services delivery for vehicle Internet of Things (IoT) communication, in accordance with aspects of the subject disclosure.

FIG. 6 depicts an additional illustration of system 100, now depicted as system 600, for cell broadcast emergency services delivery for vehicle Internet of Things (IoT) communication. System 600 includes multimedia broadcast multicast gateway 600, in collaboration with serving/packet data network gateway 502, broadcast multicast service center 402, cell broadcast center 302, traffic optimization manager 202, delivery engine 102, processor 104, memory 106, and/or storage 108, provides devices associated with the radio access network with multicast related data, such multicast related data can be considered "data heavy" (e.g., rich data sets that in addition to text also comprises URL or URI data, image data, file data, short message service (SMS) data, multimedia messaging service (MMS) data, commercial coupon data, such that the data is greater than 90 bytes that is the current limit in regard to warning alert messages).

The foregoing functionalities and facilities between traffic optimization manager 202, cell broadcast center 302, broadcast multicast service center 402, and serving/packet data network gateway 502, and multimedia broadcast multicast gateway 602 can be performed over one or more interfaces including: SGi interfaces that can extend between broadcast multicast service center 402 and serving/packet data network gateway 502; S4 interfaces that can extend between serving/packet data network gateway 502 and multimedia broadcast multicast gateway 602; SBc interfaces that can extend between cell broadcast center 302 and multimedia and broadcast multicast gateway 602; and SGmb interfaces (interfaces used for control plane message exchange between broadcast multicast service center 402 and multimedia broadcast multicast gateway 602) and SGimb interfaces (interfaces utilized for user plane/data plane exchange between multimedia broadcast multicast gateway 602 and broadcast multicast service center 402) that can extend between multimedia broadcast multicast gateway 602 and broadcast multicast service center 402.

Figure 7:
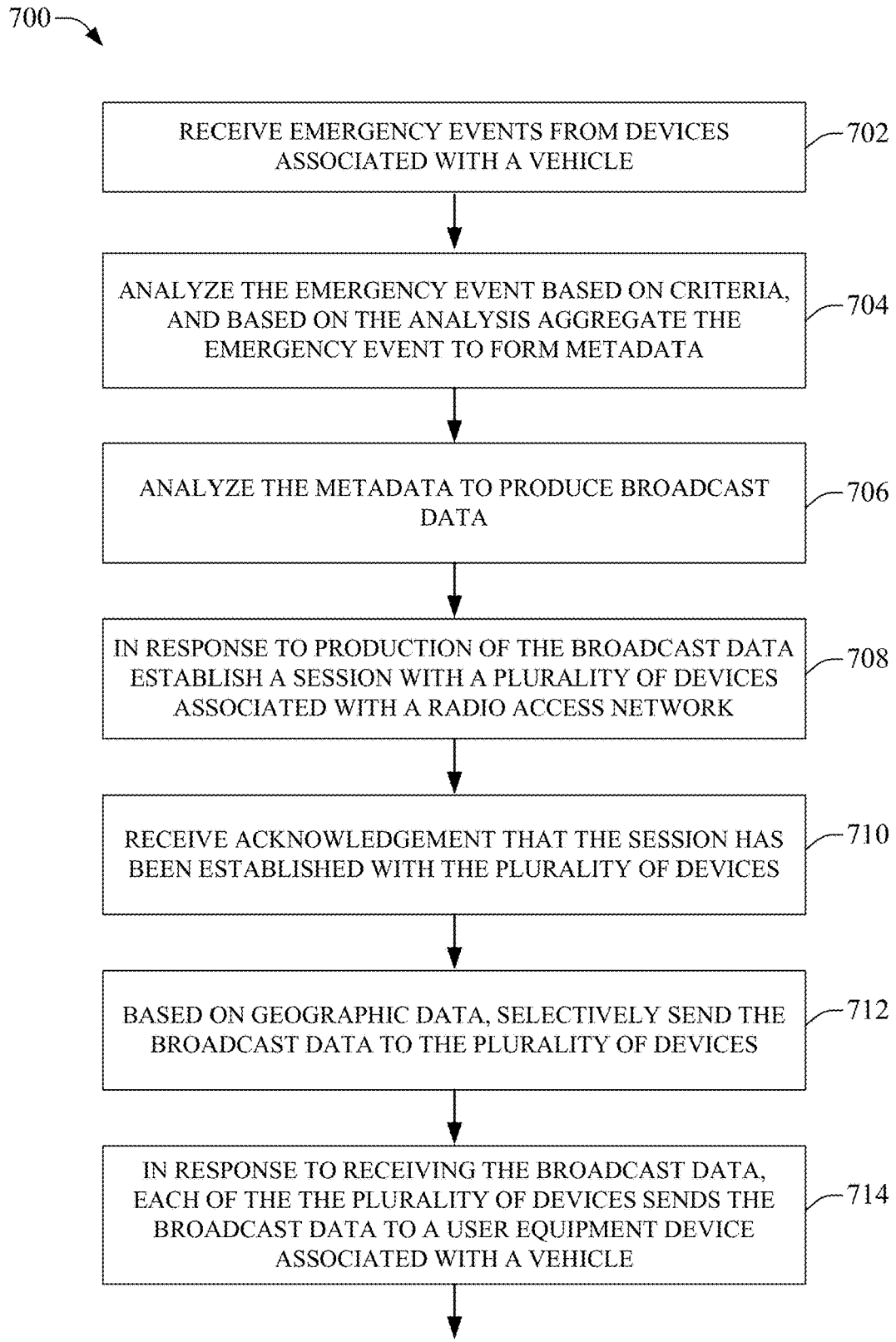
Figure 8:
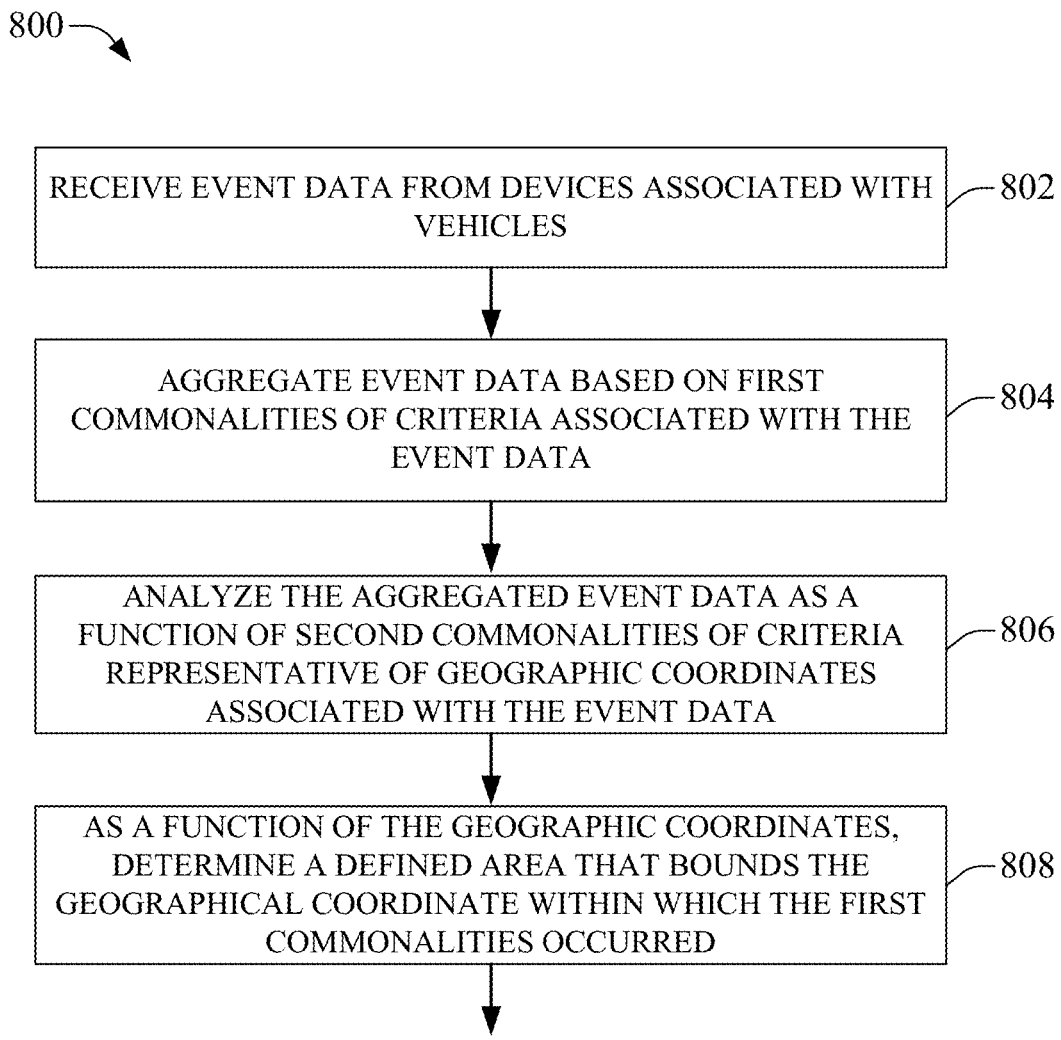
FIG. 8 illustrates another depiction of a flow or method for cell broadcast emergency services delivery for vehicle Internet of Things (IoT) communication, in accordance with aspects of the subject disclosure.

In view of the example system(s) described above, example method(s) that can be implemented in accordance with the disclosed subject matter can be better appreciated with reference to flowchart in FIGS. 7-8. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

FIG. 7 illustrates a method 700 for cell broadcast emergency services delivery for vehicle Internet of Things (IoT) communication. Method 700 can commence at 702 wherein emergency event data from devices associated with a vehicle can be received. At 704 the emergency event data can be analyzed based on groups of criteria, and based on the analysis the emergency event data can be aggregated to form aggregated metadata. At 706 the aggregated metadata can then be further analyzed to produce broadcast data. At 708, in response to the production of broadcast data, a session with a plurality of radio access network devices associated with a radio access network can be established. At 710 acknowledgment data representative of an indication that a session has been established with a plurality of radio access network devices associated with the radio access network can be received. At 712 based on geographic data determined as a function of the aggregated metadata, broadcast data representing at least emergency data can be selectively sent to the plurality of devices. At 714 in response to receiving the broadcast data each of the plurality of radio access network devices can send the broadcast data to a user equipment device associated with the vehicle.

FIG. 8 illustrates a method 800 for cell broadcast emergency services delivery for vehicle Internet of Things (IoT) communication. Method 800 can commence at 802 where event data from devices associated with vehicles can be received. At 804 the event data can be aggregated based on first commonalities of criteria associated with the event data to form aggregated event data. At 806 the aggregated event data can be analyzed as a function of second commonalities of criteria representative of, for example, geographic coordinate data associated with the event data. At 808, as a function of the geographic coordinate data, a defined area that polygonally bounds or circumscribes the geographic coordinate data within which the first commonalities of criteria occurred can be determined.

Figure 9:
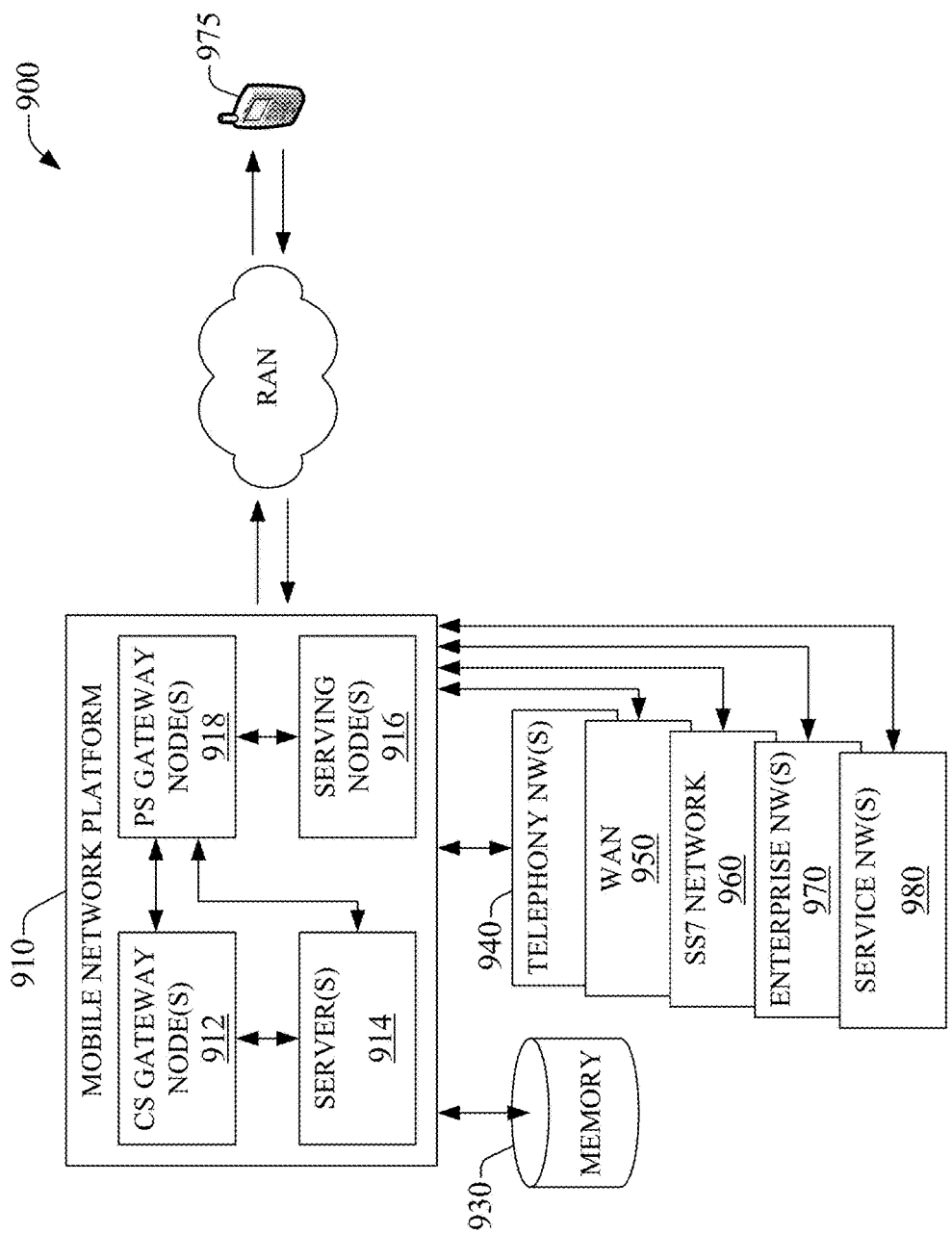
FIG. 9 is a block diagram of an example embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
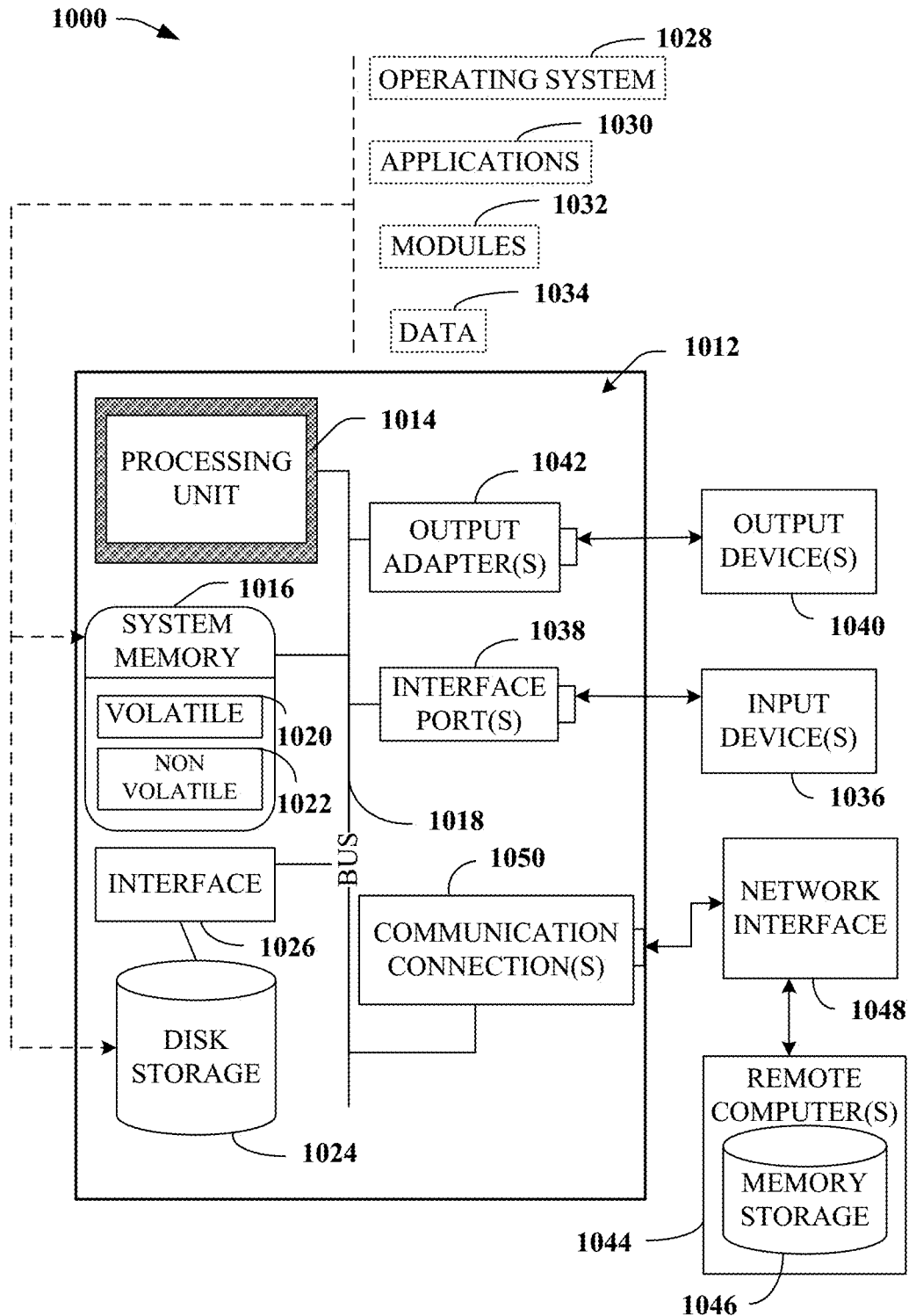
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of system 100, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters.

Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
    a processor; and
    a memory that stores executable instructions that, when executed by the processor, facilitate performance of operations, comprising:
        receiving first data representative of an emergency event associated with a vehicle, wherein the first data comprises weather data associated with the vehicle and the emergency event;
        aggregating the first data with second data to form third data;
        determining, as a function of the emergency event and the third data, a commonality between the first data and the second data;
        as a function of a longitude coordinate associated with the vehicle, a latitude coordinate associated with the vehicle and a defined peripheral boundary, determining a contiguous area that abuts the defined peripheral boundary; and
        based on the commonality identified between the first data and the second data, generating metadata, and transmitting the metadata to the vehicle and transmitting the metadata to the contiguous area.

2. The device of claim 1, wherein the second data is received from a federal emergency management agency device.

3. The device of claim 1, wherein the first data comprises the longitude coordinate associated with the vehicle and the latitude coordinate associated with the vehicle.

4. The device of claim 3, wherein the operations further comprise identifying a network device situated in a defined geographical area represented by the longitude coordinate and the latitude coordinate.

5. The device of claim 3, wherein the operations further comprise determining the defined peripheral boundary that circumscribes the longitude coordinate and the latitude coordinate.

6. The device of claim 5, wherein the operations further comprise identifying a network device within the defined peripheral boundary.

7. The device of claim 1, wherein the first data is received in response to an engine control unit associated with the vehicle detecting a deceleration of the vehicle.

8. The device of claim 1, wherein the first data is received in response to an engine control unit associated with the vehicle detecting a deployment of a bag safety device of the vehicle.

9. A method, comprising:
receiving, by a system comprising a processor, first data representative of an emergency event associated with a vehicle, wherein the first data comprises weather data associated with the emergency event and the vehicle;
associating, by the system, the first data with second data to form third data;
based on the emergency event data and the third data, determining, by the system, an existence of a commonality between the first data and the second data;
generating, by the system, metadata as a function of the existence of the commonality;
based on a longitude coordinate associated with the vehicle, a latitude coordinate associated with the vehicle, and a defined peripheral boundary, determining, by the system, an adjacent area that is contiguous to the defined peripheral boundary; and
sending the metadata to the vehicle and sending the metadata to the adjacent area based on the weather data.

10. The method of claim 9, wherein the second data is received from a federal emergency management agency device.

11. The method of claim 9, wherein the first data comprises the longitude coordinate associated with the vehicle and the latitude coordinate associated with the vehicle.

12. The method of claim 11, wherein the longitude coordinate and the latitude coordinate are obtained from a global positioning satellite system device.

13. The method of claim 11, further comprising identifying, by the system, a network device located in a defined geographical area as a function of the longitude coordinate and the latitude coordinate.

14. The method of claim 11, further comprising determining, by the system, the defined peripheral boundary that polygonally surrounds the longitude coordinate and the latitude coordinate.

15. The method of claim 14, further comprising identifying, by the system, a network device within the defined peripheral boundary.

16. The method of claim 9, wherein the first data is received in response to an engine control unit associated with the vehicle detecting a change in velocity of the vehicle.

17. The method of claim 9, wherein the first data is received in response to an engine control unit associated with the vehicle detecting a deployment of a safety device associated with a seat belt of the vehicle.

18. A machine-readable storage medium, comprising executable instructions that, when executed by a processor, facilitate performance of operations, comprising:
receiving, from a federal emergency management agency device, first data representing federal management emergency event data;
aggregating second data representing an emergency event associated with a vehicle with the first data to form third data, wherein the second data comprises weather data associated with the emergency event and the vehicle;
based on the emergency event data and the third data, determining a common cross-section between the first data and the second data;
in response to the determining the common cross-section between the first data and the second data, generating metadata;
in response to determining a defined peripheral boundary based on a longitude coordinate associated with the vehicle and a latitude coordinate associated with the vehicle, determining an area that abuts the defined peripheral boundary; and
broadcasting the metadata to the vehicle and broadcasting the metadata to the area based on the common cross-section between the first data and the second data.

19. The machine-readable storage medium of claim 18, wherein the operations further comprise initiating a session establishment protocol to establish a session with a network device of network devices associated with a radio access network.

20. The machine-readable storage medium of claim 19, wherein the latitude coordinate is a first latitude coordinate, the longitude coordinate is a first longitude coordinate, and the defined peripheral boundary is a first peripheral boundary, and wherein the operations further comprise, as a function of a second longitude coordinate associated with the network device and a second latitude coordinate associated with the network device, determining a second defined peripheral boundary that encloses the network device.

* * * * *